US006773053B2

United States Patent
Richter et al.

(10) Patent No.: US 6,773,053 B2
(45) Date of Patent: Aug. 10, 2004

(54) METHOD AND DEVICE FOR ADJUSTING A WINDOW GLASS, IN PARTICULAR ON A CABRIOLET, WITH ANTI-TRAP PROTECTION

(75) Inventors: Stefan Richter, Michelau (DE); Markus Ofen, Bischberg (DE)

(73) Assignee: Brose Fahrzeugtelle GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 10/181,613

(22) PCT Filed: Jan. 9, 2001

(86) PCT No.: PCT/DE01/00105

§ 371 (c)(1),
(2), (4) Date: Oct. 28, 2002

(87) PCT Pub. No.: WO01/53124

PCT Pub. Date: Jul. 26, 2001

(65) Prior Publication Data

US 2003/0116994 A1 Jun. 26, 2003

(30) Foreign Application Priority Data

Jan. 21, 2000 (DE) ......................................... 100 02 466

(51) Int. Cl.⁷ ................................................. B60J 1/17
(52) U.S. Cl. ............................................... 296/146.16
(58) Field of Search ...................... 296/107.07, 146.14, 296/146.16, 146.15

(56) References Cited

U.S. PATENT DOCUMENTS

| | | | |
|---|---|---|---|
| 4,468,596 A | 8/1984 | Kinzl et al. | |
| 4,793,099 A | * 12/1988 | Friese et al. | 296/146.16 |
| 4,842,327 A | 6/1989 | Hennessy | |
| 5,685,596 A | 11/1997 | Tokarz et al. | |
| 6,166,508 A | 12/2000 | Kalb | |
| 6,233,872 B1 | 5/2001 | Glagow et al. | |

FOREIGN PATENT DOCUMENTS

| | | |
|---|---|---|
| DE | 30 34 118 C2 | 3/1982 |
| DE | 36 27 234 A1 | 2/1988 |
| DE | 42 33 775 A1 | 2/1994 |
| DE | 196 32 139 C1 | 7/1997 |
| DE | 197 00 053 A1 | 10/1997 |
| DE | 197 20 713 C1 | 5/1998 |
| EP | 0 904 966 A2 | 3/1999 |

OTHER PUBLICATIONS

International Search Report of PCT/DE01/00105, dated Jun. 18, 2001.
International Preliminary Examination Report of PCT/DE01/00105, dated Jan. 24, 2002.
English translation of IPER for International Application No. PCT/DE01/00105, filed Jan. 9, 2001.

* cited by examiner

Primary Examiner—Lori L. Coletta
(74) Attorney, Agent, or Firm—Christie, Parker & Hale, LLP

(57) ABSTRACT

A method for adjusting a window glass of a motor vehicle, with anti-trap protection, in particular on a cabriolet or coupe, with a motor-driven and electronically controlled adjustment mechanism. In a partly open position of the window glass a gap exists between a side edge of the glass and an adjacent glass edge of a further window glass, or of a chassis component, for example, the pillar of a door frame. The gap is closed on closing the window glass by [means of a] movement in the Z- and X-axes. The window glass moves essentially vertically (in the Z-axis), on going from the at least partly opened position to an almost completely closed glass position, while maintaining a vertical gap, between the side edge of the glass and an adjacent sealing edge of a further window glass or a chassis component and, in the last phase of the closing process, an essentially horizontal displacement (in the X-axis) and/or a rotary movement of the window glass occurs about the transverse axis (Y-axis).

16 Claims, 3 Drawing Sheets

METHOD AND DEVICE FOR ADJUSTING A WINDOW GLASS, IN PARTICULAR ON A CABRIOLET, WITH ANTI-TRAP PROTECTION

CROSS-REFERENCE TO RELATED APPLICATION

This application claims priority of International application number PCT/DE01/00105, filed Jan. 9, 2001, which in turn claims priority of German application number 100 02 466.1, filed Jan. 21, 2000.

BACKGROUND

The invention relates to a method for adjusting a window pane of a motor vehicle with anti-trap protection, more particularly for a window pane of a cabriolet and to a device for carrying out the method. It is directed to improving the detection of jamming incidents in so-called scissor gaps which adjoin a side edge of the window pane.

From DE 30 34 118 C2 a method is known for controlling a motor-driven window lifter with anti-trap protection which calculates on the basis of measured values of the drive train, dynamic characteristic values of the window pane, such as e.g. speed and acceleration, and compares successive data with each other. If within the monitoring range for the adjustment speed of the window pane a deceleration is determined which lies outside a permissible range then a trapped incident is assumed and the window pane is moved in reverse.

Using this detection principle, which is designed as an indirect anti-trap protection, quite good results have been obtained when sensing trapped parts of the body and objects which stand directly in the way of the adjusting direction, but this did not however relate to monitoring so-called scissor gaps, as occur in cabriolets, coupes and rear windows. Considerable shear stresses can appear in these side gaps before the described indirect anti-trap protection responds. Safely restricting the jamming forces can scarcely be reached in this way.

These problems can however be overcome by using a so-called direct detecting anti-trap protection such as for example by using an electric switch strip fitted along the edge of the pane or along the closing edge on the body side associated therewith. This system has the drawback however that the switch strips may have to be incorporated in the design of the vehicle and additional costs may be incurred. A corresponding system is described in DE 197 20 713 C1.

SUMMARY

The object of the invention is to provide with simple means an anti-trap protection which ensures high functional reliability even for side scissor gaps.

According to this it is proposed that during the closing process in a first phase a window pane is moved substantially vertically (in the Z-direction) between an at least partially opened and a practically completely closed position whilst maintaining an acute-angled gap which widens out in the closing direction between the side edge of the pane and an associated closing edge of a further window pane or a bodywork part, and that then in the second phase of the closing movement the window pane undergoes a substantially horizontal displacement (in the X-direction) and/or a rotational movement about the transverse axis (Y-axis).

It is thereby possible to use a cost-effective passively detecting anti-trap protection with which it is possible to monitor as the window pane is closed first the substantially vertical movement phase and then the substantially horizontal movement phase. Shear stresses on any object which might possibly be trapped can practically no longer occur since as a result of the wedge-shaped gap which opens out in the closing direction the object is pushed in the direction of movement and is not restricted. The objects which engage in the so-called scissor gap are also subjected in the last phase of the closing movement only to the usual pressure strains as occur during the substantially vertical closing movement.

In order to reverse the path of movement according to the invention the adjusting mechanism has suitable guide slides or guide rails which control the path of the window pane through slide elements which are moved thereon. The slide elements are in active connection with a drive device of an adjusting mechanism and thus transfer the adjusting force to the window pane. Instead of guide slides or guide rails the phases of the vertical and horizontal adjusting movement of the window pane can also be controlled through a lever gearing. The acute angled gap between the side edge of the pane and an associated closing edge is kept constant during the vertically directed closing movement in order to ensure that during this phase nothing can be trapped. There is however also the possibility of slightly widening out the acute angled gap during the closing movement.

A preferred use of the invention stems from a simultaneous triggering of a closing command for two window panes which by their two side edges form a common closing area. The adjusting movements of the two window panes are controlled electronically and matched with each other so that between the side edges inside the region of the at least partially opened and the practically completely closed pane positions there always remains a non-constricting acute angled gap. The adjusting movement of the two window panes can thereby run synchronously so that the two window panes reach their closing positions simultaneously. In the last phase of the closing movement the window panes execute a substantially horizontal displacement (in the X-direction) and/or a rotational movement about the transverse axis (Y-axis).

Before the second and last phase of the closing movement of the window pane is executed in order to reach the fully closed window position, the upper edge of the pane should form with the associated outer contour of the body sealing area at the most such a narrow gap that it is not possible to insert parts of the body. Preferably the upper edge of the window pane is already located in part in the sealing area so that the upper edge is covered by the sealing profile.

Naturally the adjusting movement of the two window panes can also run asynchronously so that these reach their closing positions one after the other. A first window pane in the last phase of its closing movement thereby executes a substantially horizontal displacement (in the X-direction) and is operated at a higher adjusting speed than the second window pane which in the last phase of its closing movement executes a rotational movement about the transverse axis (Y-axis) whereby the first window pane reaches its closing position before the second window pane.

In the event that only the first window pane was opened and the second window pane remains closed after triggering a closing command at first the second window pane should be opened at least in part until a sufficiently large (defined) acute angled gap has arisen. After the opening of the second window pane or even during the opening process the first window pane can be moved into the closing position. The second window pane is then closed.

In order to safeguard that the window pane at the conclusion of the second phase of the closing movement has actually reached its fully closed position a second press into the substantially vertical direction (Y-direction) is recommended. To this end a control of the drive in said direction for a fraction of a second is generally sufficient.

The electronics unit which serves for the anti-trap protection function also controls the adjusting mechanics and movement sequences of the two window panes corresponding to a program filed in an electronic memory.

BRIEF DESCRIPTION OF THE DRAWINGS

The invention will now be explained in further detail with reference to the embodiments illustrated in the drawings in which.

Figure 1A:
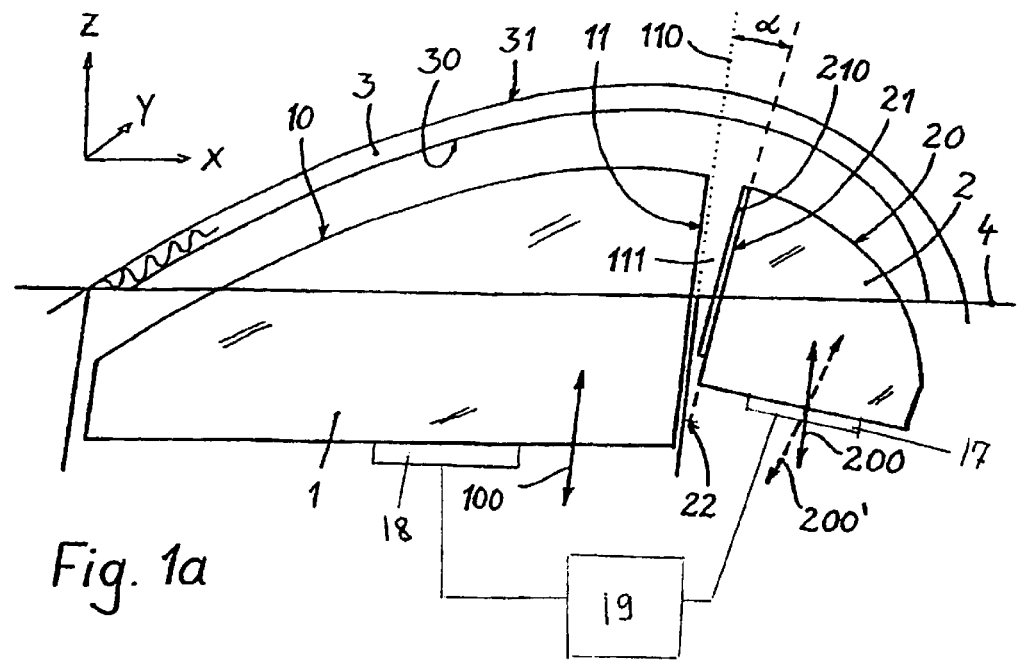
FIG. 1a shows a diagrammatic view of two adjustable window panes of a coupe in a partially opened position with a conical or expanding gap that opens in the closing direction between the side edges of the panes.

The embodiment illustrated in FIGS. 1a to 1d and described below shows a number of phases of the adjusting movement of two window panes 1 and 2 which goes far beyond that which utilizes the principle of the invention. The core of the invention actually exists in the maintaining of a conical or expanding gap 111 which opens in the closing direction between a side edge 11 of the window pane and a closing edge 21, 51 associated therewith, namely during the entire adjustment of the window pane 1 from an at least partially opened position to a practically fully closed position. This can generally be reached with simple movement sequences which have no more than two successive movement phases. The timed sequence of these movement phases is thereby not to be understood within a strict sense since simultaneous action is not essential so long as the need for the non-constricting wedge-shaped gap 111 is taken into consideration. The wedge-shaped side gap 111 is only closed when there is no more risk of entrapment between the upper edge 10 of the window pane 1 and the lower edge 30 of the associated sealing area 3 of the bodywork.

The diagrammatic illustration of FIG. 1a shows the partially opened window panes 1 and 2 of a cabriolet or coupe where on the bodywork side only the so-called girth line 4 of the vehicle and the sealing area 3 associated with the upper edges 10, 20 of the panes are indicated. Whereas the window pane 1 mounted in the vehice door (not shown) is in many cases moved by cable or arm window lifters, the displacement of the substantially smaller window pane 2 which is to be lowered in the vehicle body takes place generally by means of a so-called path-controlled window lifter where the window pane can be moved simultaneously in the z and x direction along curved guide slides and pivoted in the x-z plane. In this embodiment, adjustment mechanisms comprise lever gearings 17 and 18 and are connected to electronics unit 19. These technical means which are known per se are designed, and the travel over the adjustment path of the window panes 1, 2 is controlled, so that during the overall adjusting process the window panes 1, 2 include an acute angled gap 111 between the side edges 11, 21 of the window panes between the at least partially opened position and a practically completely closed pane position.

This gap 111 arises as the window pane 2 is lowered as a result of a swivel movement about a swivel axis 22 which lies according to this embodiment in an extension of the side edge 21 underneath the window pane 2. Naturally the swivel axis 22 can also be provided at another point in dependence on the structural conditions. For completeness only, it should be pointed out that furthermore or in place of the window pane 2, the other window pane 1 can be swivelled or tilted anti-clockwise in order to observe the desired wedge shaped gap 111 which opens in the closing direction (Z-direction).

The opening angle $\alpha$ of the wedge-shaped gap 111 can be kept very small (for example 1 degree) for lowering the risk of injury in comparison with the known scissor gaps where during the closing process the gap width as a rule decreases continuously. In principle it would be sufficient if a constant gap width could be guaranteed over the relevant adjustment path. As a result of the unavoidable tolerances it therefore appears advantageous to provide structurally at least a small opening angle $\alpha$. The greater the opening angle a and the width of the gap 111, the lower the risk of injury therefore.

Figure 1B:
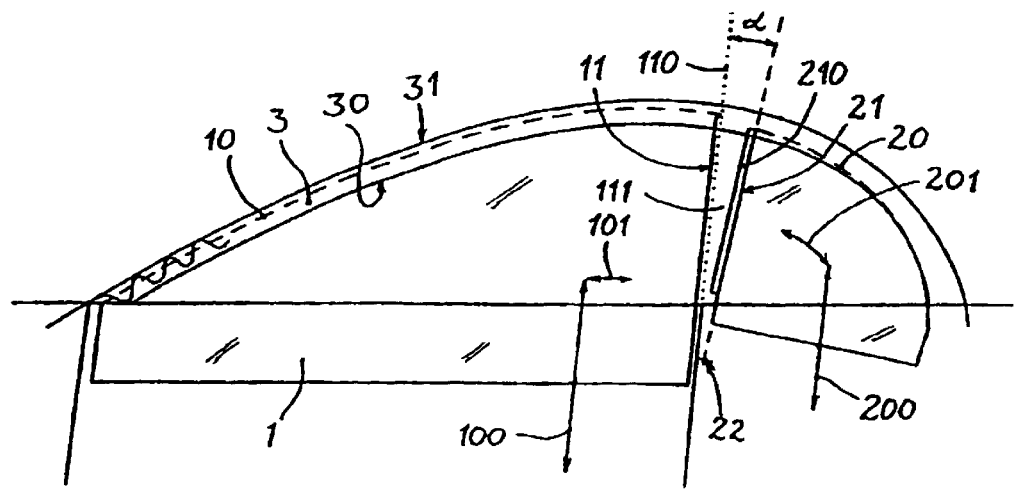
FIG. 1b as FIG. 1a, but in a practically completely closed position.

From the position illustrated in FIG. 1a the window panes 1, 2 can be moved synchronously into the substantially closed position, as shown in FIG. 1b, wherein the upper edges 10, 20 of the window panes 1, 2 lie already inside the sealing region 3, without however having already to reach the sealing stop. The window panes 1, 2 are thereby moved along the adjusting directions 100, 200 parallel to the withdrawing line 110, e.g., in a substantially vertical direction.

The window pane 2 can where applicable also be moved along the adjusting direction 200' wherein the gap width would increase, and the sensitivity regarding a trapped incident between the upper edge 20 of the window pane and the seal 3 which is inclined sharply in this area would be improved. Furthermore a swivel movement about an axis 22 in the clockwise direction can also be superimposed on this movement along the adjusting direction 200', which would lead to an enlargement of the opening angle $\alpha$. In the event of a closing movement along the adjusting direction 200' the swivel movement can take place about the axis 22 also anticlockwise but only to such an extent that the gap width which widens out as a result of the closing direction 200' which is inclined to the withdrawing direction 110 is not overcompensated by the contra swivel movement. Restriction of the gap 111 and reduction of the opening angle $\alpha$ are not permissible.

After the situation shown in FIG. 1b has been reached, the gap 111 can be closed by a swivel movement about the swivel axis 22 in the direction 201, e.g., in a substantially horizontal direction. Any object which might possibly be present in the gap 111 can be detected by the anti-trap protection device safely and by guaranteeing comparatively small jamming forces since this movement phase in the direction 201 has comparable conditions regarding the closing movement in the direction 200, 200' (in the direction of the sealing area (3).

At the same time as the swivel movement of the window pane 2 in the direction 201 where necessary a horizontal displacement movement of the window pane 1 can take place in the direction 101. In this case lowering of the window pane 1 would involve a displacement in the driving direction, e.g. in order to achieve a rapid separation of the side edge 11 of the pane from the sealing element 210 which is formed on the side edge 21 of the other window pane 2.

Figure 1C:
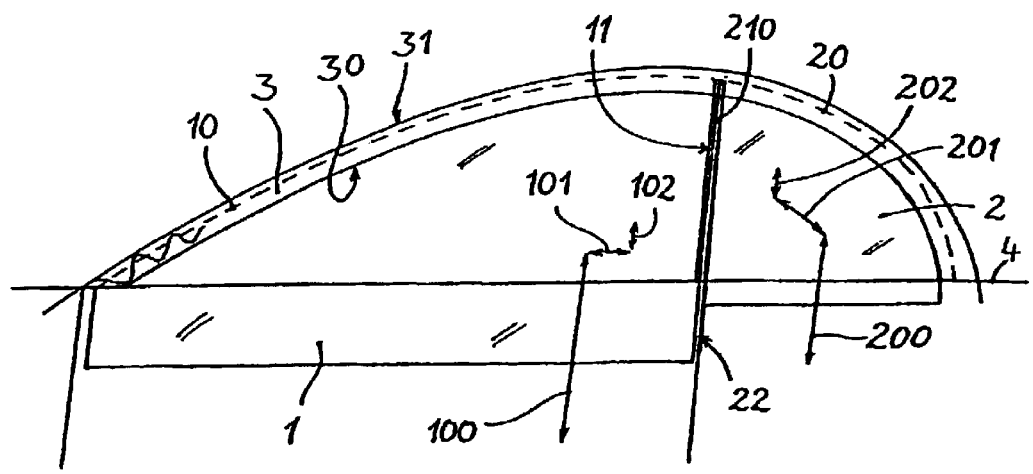
FIG. 1c as FIG. 1b but after the gap has been closed.
Figure 1D:
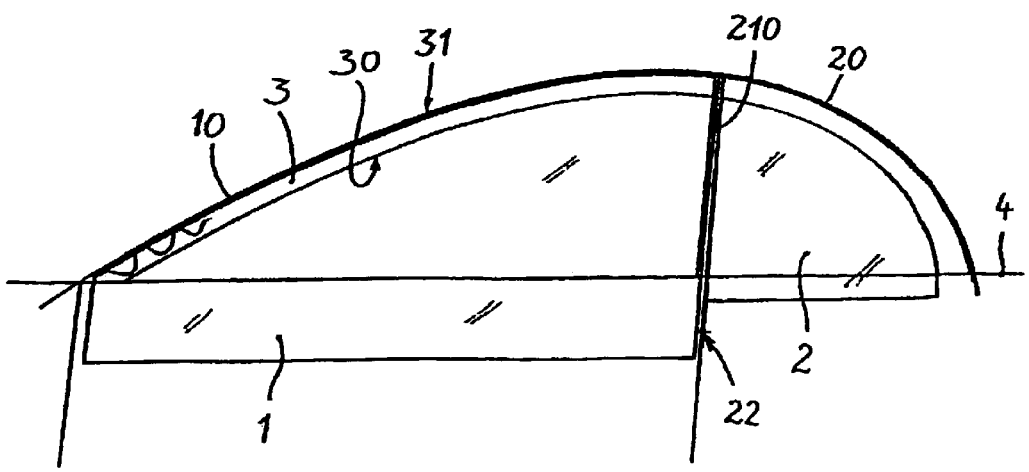
FIG. 1d as FIG. 1c but after an additional slight adjusting movement of the two window panes in the vertical direction.

After reaching the situation shown in FIG. 1c where necessary a second press of the window panes 1, 2 into the substantially vertical adjustment direction (phases 102, 202) can be proposed in order to reach a sealing stop 31 with the upper edges 10, 20 of the pane. It is thus guaranteed that a completely closed situation is reached (see FIG. 1d).

In addition to the substantially simultaneous adjustment of the window panes 1 and 2 described with the aim of achieving the closed positions as simultaneously as possible, the adjustment of the window panes 1, 2 can however also take place in succession with different adjusting speeds or with only partially synchronously running movements. Which of the many possible design variations is to be selected depends on the structural factors such as in particular the adjusting kinematics and other peripheral conditions (e.g. the requirements of the automobile manufacturer).

Figure 2:
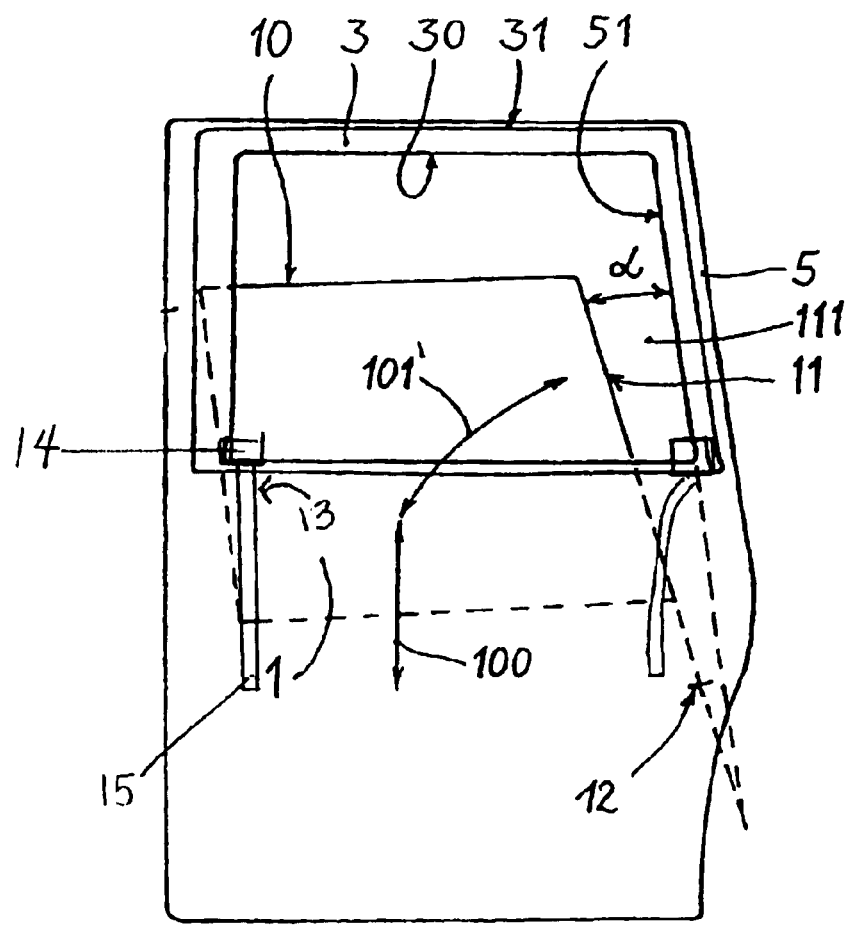
FIG. 2 shows a diagrammatic view of a rear door of a motor vehicle with a partially lowered window pane wherein a gap which opens in the closing direction is provided between the side piece on the C-pillar side and the associated side edge of the window pane.

FIG. 2 shows diagrammatically a rear door of a motor vehicle with a partially opened window pane 1. The window pane 1 is located in a state tilted at angle α about the swivel axis 12 so that its side closing edge (on the C pillar side) includes with the associated closing edge 51 of the associated side piece 5 of the window frame a wedge-shaped gap 111 which opens in the closing direction. During the closing movement the gap 111 is not restricted. Only after the upper edge 10 of the window pane has projected into the sealing area or forms with the lower edge 30 of the sealing area 3 still only such a small gap that parts of the body (more particularly fingers)can no longer be clamped, is the window pane 1 swivelled back into the vertical position corresponding to the swivel curve 101' by the adjusting mechanism 13, comprising slide elements 14 on guide rails 15. The edges 10, 11 of the window pane are again aligned parallel to the associated regions of the seal 3. When necessary a press can then take place in the vertical direction 100 in order to ensure that the upper edge 10 of the pane has actually reached the sealing stop 31.

What is claimed is:

1. A method for adjusting a window pane of a motor vehicle with anti-trap protection and a motor driven and electronically controlled adjusting mechanism, comprising:
   moving the window pane to an at least partially opened position and forming an acute angled gap during an opening movement of the window pane between a side edge of the pane and an associated closing edge of one of a further window pane and a bodywork part;
   moving the window pane substantially vertically from the at least partially opened position to a practically completely closed position while maintaining the acute-angled gap between the side edge of the pane and the associated closing edge of the one of the further window pane and the body part;
   then moving the window pane in at least one of a substantially horizontal displacement and a rotary movement of the window pane about a transverse axis.

2. The method according to claim 1 wherein as the window pane travels between the at least partially opened position and the practically completely closed position of the pane, the acute-angled gap between the side edge of the pane and the associated closing edge is one of increased and kept constant.

3. The method according to claim 1 wherein the window pane is a first window pane and the one of the further window pane and the body work part is a second window pane, wherein after a simultaneous triggering of a closing command for two window panes which with their two side edges form a common closing area, the adjustment movements of the two window panes are electronically controlled and matched with each other so that between their side edges within the area of the at least partially opened and practically completely closed pane positions there always remains a non-constricting acute-angled gap.

4. The method according to claim 3 wherein the adjusting movements of the two window panes run synchronously so that these reach their closing positions at the same time.

5. The method according to claim 4 wherein both window panes in a final phase of the closing movement execute the at least one of the substantially horizontal displacement and the rotary movement of the window pane about the transverse axis.

6. The method according to claim 3 wherein the adjusting movements of the two window panes run asynchronously so that these reach their closing positions one after the other.

7. The method according to claim 6 wherein the first window pane in a last phase of its closing movement executes a substantially horizontal displacement and is operated at a higher adjusting speed than the second window pane which in a last phase of its closing movement executes a rotary movement about the transverse axis wherein the first window pane reaches its closing position before the second window pane.

8. The method according to claim 1 wherein the window pane is a first window pane and the one of the further window pane and the body work part is a second window pane, and wherein after the triggering of a closing command for the at least partially opened first window pane which in a second phase of its closing movement executes a substantially horizontal displacement, first the second window pane which in a second phase of its closing movement executes a rotary movement about the transverse axis, is opened at least partly until a substantially large acute-angled gap is formed, and that one of during and after the opening of the second window pane the first window pane is moved into the closing position and that finally the second window pane is closed.

9. The method according to claim 1, wherein an upper edge of the window pane prior to execution of a last phase of the closing movement is moved into a sealing area so that the upper edge is covered by a sealing profile.

10. The method according to claim 1 wherein after conclusion of a second phase of the closing movement of the window pane, a second press into a substantially vertical direction takes place.

11. A device for adjusting a window pane of a motor vehicle with anti-trap protection, comprising:
   a motor driven and electronically controlled adjusting mechanism;
   a window lifter mechanism;
   wherein in an at least partly opened position of the window pane between a side edge of the pane and an associated closing edge of one of a further window pane and a body part there is a gap which can be closed during closing of the window pane;
   wherein the window lifter mechanism is formed so that the side edge of the window pane in each adjusting position between the at least partly opened position and a practically completely closed pane position includes with the associated closing edge of the one of the further window pane and the bodywork part an acute-angled gap which in a last phase of a closing movement can be closed by at least one of a substantially horizontal displacement and a rotary movement of the window pane about a transverse axis.

12. The device according to claim 11 wherein the adjusting mechanism has one of guide slides and guide rails which are provided for guiding slide elements connected to the window pane and which are connected to a drive device of the adjusting mechanism.

13. The device according to claim 11 wherein the adjusting mechanism has a lever gearing which controls phases of vertical and horizontal adjusting movements of the window pane.

14. The device according to claim 11 wherein an upper edge of the window pane on reaching the practically completely closed position forms with an associated outer contour of a body sealing area at most a gap which is so narrow that it is not possible for parts of a body to become trapped.

15. The device according to claim 14 wherein the upper edge of the pane on reaching the practically completely closed pane position is located completely inside the body sealing area without having fully reached an end position of the window pane.

16. The device according to claim 11 wherein the window pane is a first window pane and the one of the further window pane and the body work part is a second window pane, and wherein an electronics unit which electronically couples the adjusting mechanisms of the two window panes which with their side edges form a common closing region so that the adjusting movements of the two window panes are tuned with each other according to a program filed in an electronic memory.

* * * * *